(12) United States Patent
Chen et al.

(10) Patent No.: US 11,270,402 B2
(45) Date of Patent: Mar. 8, 2022

(54) VIAL CONTENT DETECTION USING ILLUMINATED BACKGROUND PATTERN

(71) Applicant: Novanta Corporation, Bedford, MA (US)

(72) Inventors: Mo Chen, Manlius, NY (US); Kevin D. Bower, North Syracuse, NY (US)

(73) Assignee: Novanta Corporation, Bedford, MA (US)

( * ) Notice: Subject to any disclaimer, the term of this patent is extended or adjusted under 35 U.S.C. 154(b) by 0 days.

(21) Appl. No.: 17/001,149

(22) Filed: Aug. 24, 2020

(65) Prior Publication Data

US 2021/0056660 A1    Feb. 25, 2021

Related U.S. Application Data

(60) Provisional application No. 62/890,342, filed on Aug. 22, 2019.

(51) Int. Cl.

| G06T 1/00 | (2006.01) |
|---|---|
| G06K 9/46 | (2006.01) |
| G06T 7/00 | (2017.01) |
| G06T 7/60 | (2017.01) |
| G06K 9/20 | (2006.01) |

(52) U.S. Cl.
CPC .......... *G06T 1/0014* (2013.01); *G06K 9/2036* (2013.01); *G06K 9/4652* (2013.01); *G06T 7/0008* (2013.01); *G06T 7/60* (2013.01)

(58) Field of Classification Search
None
See application file for complete search history.

(56) References Cited

U.S. PATENT DOCUMENTS

| 2,573,006 | A | * | 10/1951 | Good | G01F 23/292 73/293 |
|---|---|---|---|---|---|
| 2,716,892 | A | * | 9/1955 | Kinderman | G01F 23/02 73/293 |
| 2,884,783 | A | * | 5/1959 | Spengler | G01F 23/292 73/290 R |
| 3,446,222 | A | * | 5/1969 | Barker | G01F 23/2921 137/2 |
| 9,418,416 | B2 | * | 8/2016 | Milne | G06T 7/246 |
| 2010/0184056 | A1 | * | 7/2010 | Weinberger | B01L 3/508 435/6.16 |
| 2011/0043618 | A1 | * | 2/2011 | Salisbury | G02B 21/32 348/79 |
| 2015/0335532 | A1 | * | 11/2015 | Lizari Illarramendi | B65B 43/59 141/1 |
| 2020/0134773 | A1 | * | 4/2020 | Pinter | G06T 7/521 |

* cited by examiner

*Primary Examiner* — Tyler W. Sullivan
(74) *Attorney, Agent, or Firm* — Bond Schoeneck and King PLLC; David Nocilly

(57) ABSTRACT

A machine vision system that uses an imager to capture an optical image of a target object that may contain a liquid. The target object is illuminated by an illumination source positioned oppositely from the imager and a predetermined pattern is positioned between the illumination source and the target object so that the imager will capture optical images of the background pattern through any liquid positioned in the target object. A processor is programmed to analyze captured images to detect any distortions of the pattern that are attributable to the presence of a liquid in the target object.

16 Claims, 5 Drawing Sheets

VIAL CONTENT DETECTION USING ILLUMINATED BACKGROUND PATTERN

CROSS-REFERENCE TO RELATED APPLICATIONS

The present application claims priority to U.S. Provisional Application No. 62/890,342, filed on Aug. 22, 2020, hereby incorporated by reference in its entirety.

BACKGROUND OF THE INVENTION

1. Field of the Invention

The present invention to machine vision detection and, more specifically, to the detection of the presence of vial contents using a background pattern.

2. Description of the Related Art

Machine vision plays an important role in automated and robotic systems, such as assembly line manufacturing, quality control inspection, and sample processing. Conventional systems are generally comprised of an optical imager, such as a charged coupled device (CCD) or similar device using digital imaging technology, which is positioned to capture images of objects that pass in front of the imager. In low-light or enclosed applications, machine vision systems may include an illumination source, such as a bank of light emitting diodes (LEDs), positioned proximately to the imager. The images are subsequently processed to decode information contained in the resulting two-dimensional image, such as 1D linear codes, 2D stacked/matrix codes, OCR fonts, and postal codes. The image captured by the machine vision system may also be subjected to more advanced processing, such as shape recognition or detection algorithms, that provide information about the object of interest in the image.

When machine vision is used to detect the presence of liquid in a vial, however, there may be problems differentiating vials that contain liquid from those that are empty. For example, when the vials contain a clear liquid or very small amounts of liquid, mere backlighting of the vials do not provide enough information for differentiation from empty vials. Accordingly, there is a need in the art for a machine vision approach that can more accurately differentiate vials containing liquids from vials that are empty.

BRIEF SUMMARY OF THE INVENTION

The present invention comprises a machine vision system having an imager for capturing an optical image of a target object that is transparent or translucent and is illuminated by an illumination source positioned oppositely from the imager. A predetermined pattern is positioned between the illumination source and the target object so that the imager can capture an optical image of the background pattern through the target object. The machine vision system further includes a processor programmed to detect distortions of the pattern that are attributable to the presence of any liquid in the target object. Leveraging a pattern placed on top of background illumination behind a vial, such as a grid pattern, allows the machine vision processor to look for distortions of the pattern due to light refraction. Without this pattern, no refraction can be seen and colorless liquid contents can be hard to detect.

More specifically, in a first embodiment, the present invention is a machine vision system having an imager for capturing an optical image of a target object, an illumination source positioned oppositely from the imager, a predetermined pattern positioned between the illumination source and the target object, and a processor programmed to evaluate the optical image to determine whether there are any distortions of the predetermined pattern attributable to a liquid positioned in the target object. The processor may be programmed to determine whether there any distortions of the predetermined pattern based upon the refraction of light passing through the predetermined pattern and the target object. A plurality of the target objects may be targeted with the processor programmed to evaluate the optical image to determine whether there are any distortions of the predetermined pattern in each of the plurality of the target objects. The processor may be programed to whether there any distortions of the predetermined pattern using fast Fourier transform. The pattern may comprise a grid. The illumination source may comprise a bank of light emitting diodes. The target object may comprise a vial having a base and a body that extends from the base along a longitudinal axis. The grid may be positioned below the base of the vial. The light emitting diodes may be positioned below the grid and oriented to direct illumination through the grid and along the longitudinal axis of the body.

In another embodiment, the present invention is a method of determining whether a target object has a liquid positioned therein. In a first step, the method involves positioning a predetermined pattern between an illumination source and the target object. In another step, the method involves directing illumination from the illumination source through the predetermined patterns and the target object. In a further step, the method involves capturing an optical image of the target object and any portion of the predetermined pattern visible through the target object. In an additional step, the method involves using a processor to evaluate the optical image to determine whether there are any distortions of the predetermined pattern attributable to a liquid positioned in the target object. The processor may be programmed to determine whether there any distortions of the predetermined pattern based upon the refraction of light passing through the predetermined pattern and the target object. The step of positioning a predetermined pattern between an illumination source and the target object may comprise positioning a plurality of the target objects between the illumination source and the target object and the step of using a processor to evaluate the optical image may comprise evaluating the optical image to determine whether there are any distortions of the predetermined pattern in each of the plurality of the target objects. The step of using the processor may comprise determining whether there any distortions of the predetermined pattern using a fast Fourier transform. The pattern may comprise a grid. The illumination source may comprise a bank of light emitting diodes. The target object may comprise a vial having a base and a body that extends from the base along a longitudinal axis. The step of positioning a predetermined pattern between an illumination source and the target object may comprise positioned the grid below the base of the vial. The step of positioning a predetermined pattern between an illumination source and the target object may comprise positioning the light emitting diodes below the grid and orienting the light emitting diodes to direct illumination through the grid and along the longitudinal axis of the body.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
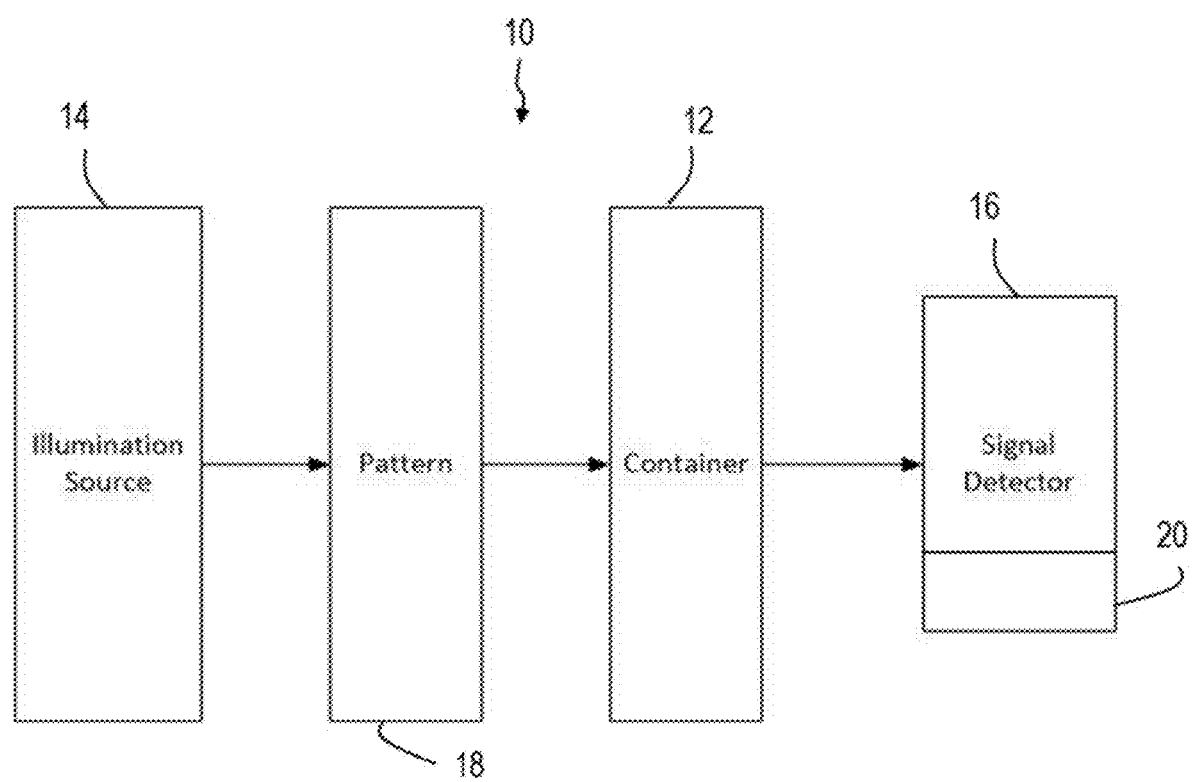
FIG. 1 is a schematic of a machine vision system according to the present invention.

Referring to the figures, wherein like numeral refer to like parts throughout, there is seen in FIG. 1 a machine vision system 10 comprising a target object 12, such as a vial that may or may not contain a liquid, an illumination source 14 such as a bank of light emitting diodes (LEDs) positioned on a first side of target object 12, and a signal detector 16, such as an machine vision smart camera with an integrated visional processor, on a second, opposing side of target object 12. A predetermined pattern 18 is positioned between the illumination source 14 and target object 12. For example, predetermined pattern 18 may be applied to the surface of illumination source 14 or may be applied to a separate substrate positioned against illumination source 14 or suspended between illumination source 14 and target object 12. A processor 20 that is included as part of or associated with signal detector 16 is programmed to analyze optical images captured by signal detector 16 to detect any distortion of predetermined pattern 18 that can be attributed to the presence of a liquid in target object 12. If processor 20 determines that any portion of predetermined pattern 18 has been distorted in a manner indicative of the light from predetermined pattern 18 passing through a liquid, processor 20 can signal the detection of a liquid in target object 12. Although a grid may comprise predetermined pattern 18, it should be recognized that any static pattern may be used.

Figure 2:
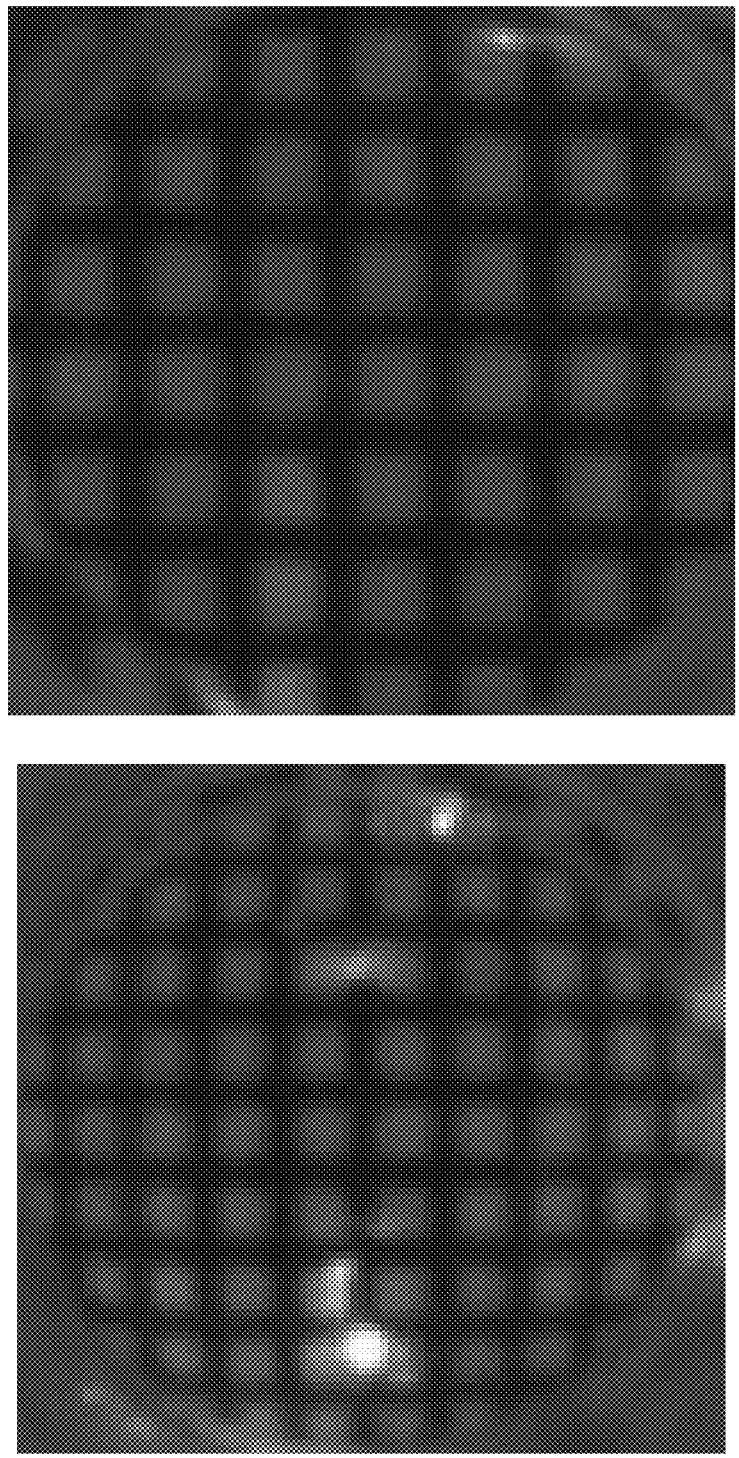
FIG. 2 are images of a predetermined pattern according to the present invention that is free of distortion in the absence of a liquid in an individual target object and that is distorted as a result of liquid in the target object.
Figure 3:
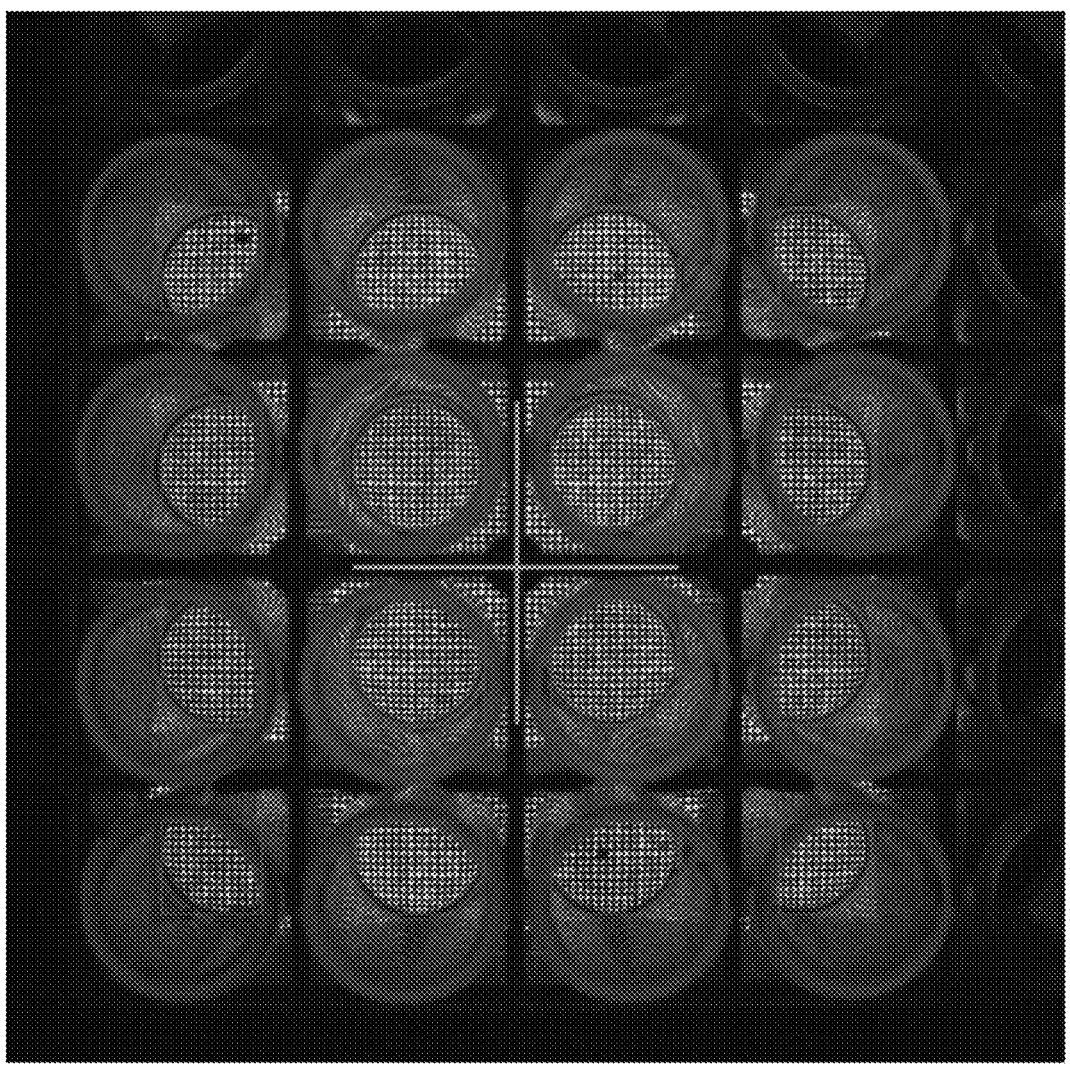
FIG. 3 is an image of the present invention used to detect the presence of liquid in an image captured of multiple vials positioned in a cleaning tray.

Referring to FIG. 2, optical images that are captured of predetermined pattern 18 through target object 12 will be free of distortion in the absence of a liquid. In this example, pattern 18 is positioned below target object 12, which is shown as a grid positioned below the base or bottom of a vial and illuminated by LEDs positioned below the grid and oriented to illumination upwardly through the grid and then along the longitudinal axis of vial from the base through the body of the vial. When a liquid is present in target object 12, however, predetermined pattern 18 will be distorted as a result of liquid in the target object. As seen is FIG. 3, multiple target objects 12 may be captured an evaluated in single image. The distance between the illumination, the pattern, and the bottom of the tube impact the differences in distortion due to lens effect of the liquid. Accordingly, these distances may be varied to improve the final determination of whether a liquid is present in target object 12.

Processor 20 may be programmed using conventional image processing techniques to detect any distortion of predetermined pattern 18 that is attributable to a liquid. For example, fast Fourier transforms (FFTs) may be used alone or in combination with deep learning to detect either or both of frequency and feature changes of predetermined pattern 18. Using predetermined pattern 18 allows for feature extraction and distortion checking of the pattern of predetermined pattern 18, such as pixel correlations. The frequency domain can also be used to look for distortions in a grid used for predetermined pattern 18. If distortion is detected, the vial can be deemed as containing liquid and refracting predetermined pattern 18. The distortion analysis can optionally be extended to the presence or absence of a portion of predetermined pattern 18 to detect solids in the vial, or a liquid that has foam or bubbles that prevent predetermined pattern 18 being analyzed.

If signal detector 16 comprises a color image, color information may be used to determine the presence of a liquid in target object 12. For example, an RGB image can be converted to a YCbCr image. The YCbCr image may then be used to generate a histogram of the Cb and Cr color components. A mean value of the 30 percent brightest histogram is then calculated to avoid the grid components, which are preferably black, and only get the color information of the bright areas with the capture image. This value may then be compared against the value obtained from a liquid-free image to determine if there is a change in color information indicating the presence of a liquid.

For FFT analysis, the number of grid lines in a given area will be different when a liquid is present. Hence, in the frequency domain, the frequency will be farther away from the zero point (DC frequency) than the case without liquid. All DC frequency components should be set to zero in order to only keep the high frequency parts. In this way, the below high frequency distribution with/without liquid. This analysis shows that with liquid present in target object 12, the distance of the two horizontal high frequency and the distance of the two vertical high frequency will be much larger than that without liquid. A 2D FFT may be calculated through 1D horizontal FFT followed by 1D vertical FFT. If 1D horizontal FFT is able to find the larger frequency distance, then the 1D vertical FFT may be omitted to save time.

Figure 4:
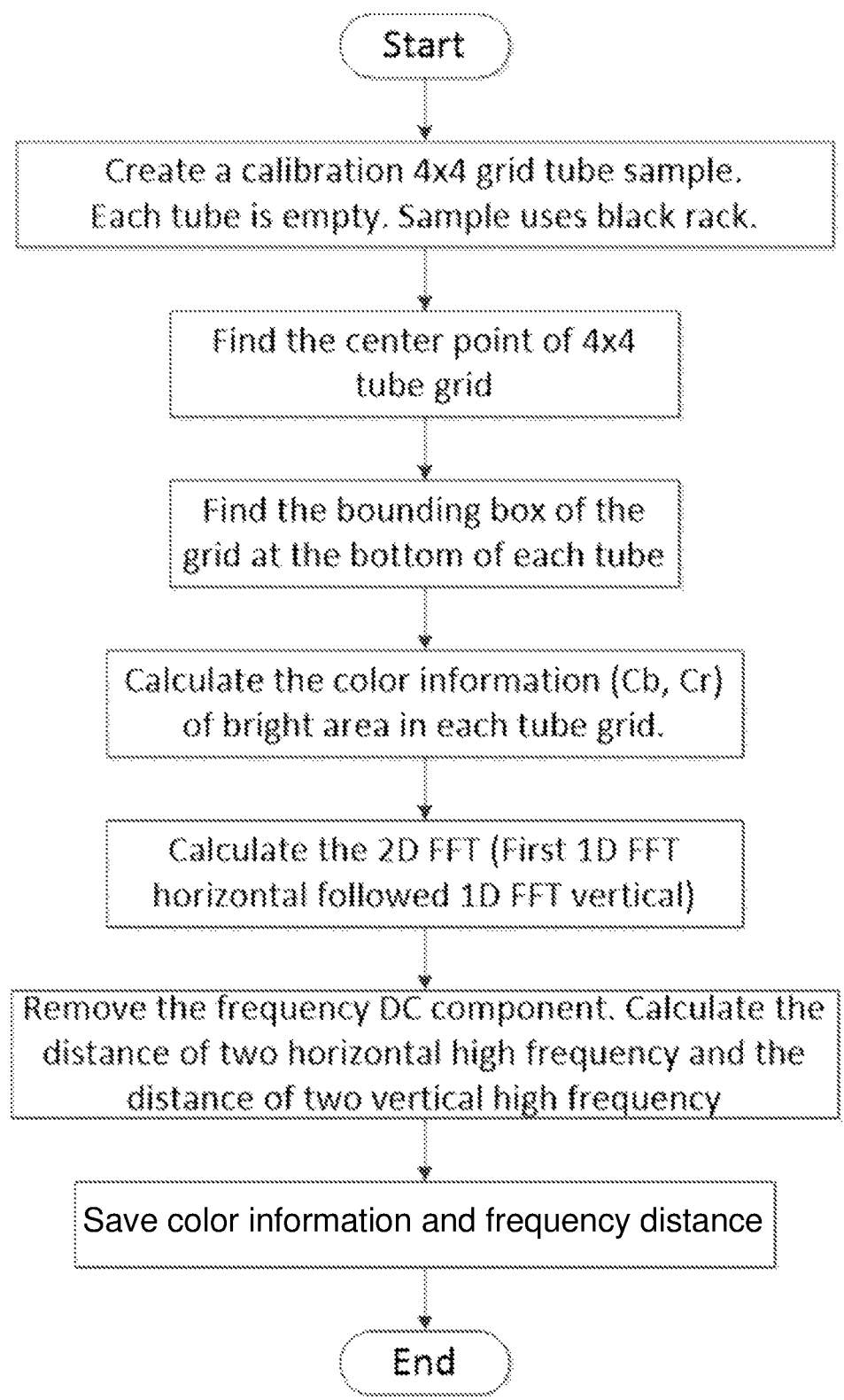
FIG. 4 is a flowchart of a calibration process according to the present invention.
Figure 5:
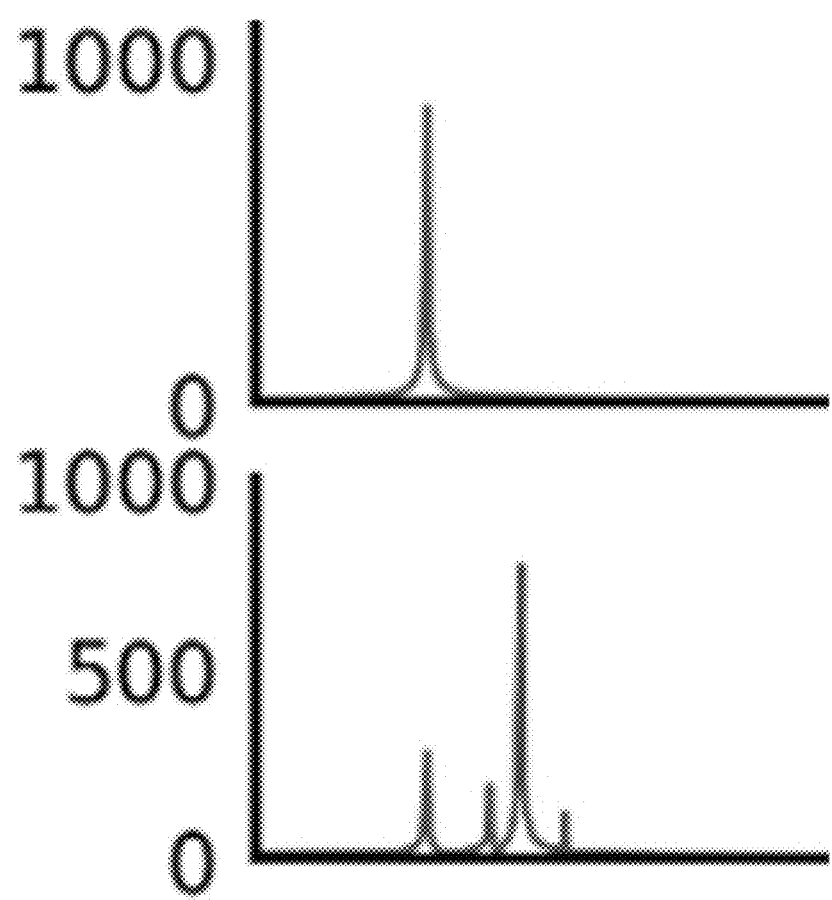
FIG. 5 is a pair of graphs illustrating a frequency change in images captured according to the present invention due to the presence of a liquid in the target object.

There is seen in FIG. 4 a process for preparing a calibration image for use in detecting the presence of a liquid using an FFT analysis. For detection, the center of the test image is found first. Then, the center point is compared to the saved calibrated center point to find the X, Y offset. The offset is then applied to the saved calibrated bounding box coordinates to obtain the test image bounding box coordinates without complicated computations. Second, for the area inside each bounding box, the color information and frequency distance are calculated in the same manner as in the calibration process. The calculated color information and frequency distance may then be compared to the calibration color information and frequency distance. If the absolute difference is greater than a predetermined threshold, a conclusion may be made that specific vial has liquid. Otherwise, there is no liquid present in that vial. As seen in FIG. 5, the fundamental frequencies and peaks change between target object 12 that does not have a liquid (top), and target object 12 that contains a liquid (bottom). It should be recognized that color and FFT may used individually or in combination to further improve detection results.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A machine vision system, comprising:
    an imager;
    a bank of light emitting diodes positioned oppositely from the imager to provide a location where a plurality of target objects contained in a tray can be positioned between the imager and the bank of light emitting diodes;
    a predetermined pattern applied to a substrate and positioned between the illumination source and the plurality of target objects contained in the tray so that light from the illumination source will pass through the substrate and the predetermined pattern before passing through the plurality of target objects so that the predetermined pattern is visible to the imager through the plurality of objects; and
    a processor coupled to the imager to receive an optical image captured by the imager that includes the plurality of target objects contained in the tray and the predetermined pattern applied to the substrate visible through the plurality of target objects and programmed to evaluate the optical image to determine whether each of the plurality of target objects in the tray has a liquid positioned in the target object based on whether the optical image includes any distortions of the predetermined pattern attributable to refraction of light passing through the presence of any liquid contained in each of the target objects.

2. The system of claim 1, wherein the processor is programed to whether there are distortions of the predetermined pattern using fast Fourier transform.

3. The system of claim 1, wherein the imager is a color imager and wherein the processor is programed to whether there are distortions of the predetermined pattern based on whether there is a change in color.

4. The system of claim 1, wherein the predetermined pattern applied to the substrate comprises a grid.

5. The system of claim 4, wherein the illumination source comprises a bank of light emitting diodes.

6. The system of claim 5, wherein the target object comprises a vial having a base and a body that extends from the base along a longitudinal axis.

7. The system of claim 6, wherein the grid is positioned below the base of the vial.

8. The system of claim 7, wherein the light emitting diodes are positioned below the grid and oriented to direct illumination through the grid and along the longitudinal axis of the body.

9. The system of claim 1, wherein the processor is programed to whether there are distortions of the predetermined pattern by comparing the optical image to a calibration image of the predetermined pattern with liquid absent from the plurality of target objects.

10. A method of determining whether a target object has a liquid positioned therein, comprising:
    positioning a predetermined pattern applied to a substrate between a bank of light emitting diodes and a plurality of target objects contained in a tray;
    directing illumination from the bank of light emitting diodes through the predetermined pattern and the target object;
    capturing an optical image of the plurality of target objects contained in the tray and any portion of the predetermined pattern visible through the plurality of target objects using an imager positioned oppositely from the bank of light emitting diodes relative to the plurality of target objects contained in the tray; and
    using a processor to evaluate the optical image to determine whether the illumination has been refracted by any liquid positioned in each of the plurality of target objects based on distortions of the predetermined pattern in the optical image that are attributable to the presence of any liquid contained in each of the target objects.

11. The method of claim 10, wherein step of using the processor comprises determining whether there any distortions of the predetermined pattern using a fast Fourier transform.

12. The method of claim 10, wherein the step of capturing an optical image of the target object and any portion of the predetermined pattern visible through the target object using an imager positioned oppositely from the illumination source relative to the target object comprising using a color imager and wherein the step of using the processor comprises determining whether there is a change in color.

13. The method of claim 10, wherein the predetermined pattern applied to the substrate comprises a grid.

14. The method of claim 13, wherein each of the target objects comprises a vial having a base and a body that extends from the base along a longitudinal axis.

15. The method of claim 14, wherein the step of positioning a predetermined pattern between an illumination source and the target object comprises positioned the grid below the base of the vial.

16. The method of claim 15, wherein the step of positioning a predetermined pattern between an illumination source and the target object comprises positioning the light emitting diodes below the grid and orienting the light emitting diodes to direct illumination through the grid and along the longitudinal axis of the body.

* * * * *